(12) United States Patent
Cornelius

(10) Patent No.: US 7,798,436 B2
(45) Date of Patent: Sep. 21, 2010

(54) PORTABLE ROTARY CHIPPER APPARATUS

(75) Inventor: James A. Cornelius, Sycamore, IL (US)

(73) Assignee: The Toro Company, Bloomington, MN (US)

( * ) Notice: Subject to any disclaimer, the term of this patent is extended or adjusted under 35 U.S.C. 154(b) by 91 days.

(21) Appl. No.: 12/321,571

(22) Filed: Jan. 22, 2009

(65) Prior Publication Data

US 2010/0181399 A1 Jul. 22, 2010

(51) Int. Cl.
*B02C 19/00* (2006.01)

(52) U.S. Cl. .............. 241/55; 241/92; 241/298

(58) Field of Classification Search .......... 241/55, 241/92, 296, 298
See application file for complete search history.

(56) References Cited

U.S. PATENT DOCUMENTS

| 4,317,544 | A | 3/1982 | Lapointe |
| 4,534,390 | A | 8/1985 | Morey et al. |
| 4,619,410 | A | 10/1986 | Lenzer et al. |
| 4,770,217 | A | 9/1988 | Strong |
| 4,827,989 | A | 5/1989 | Strong |
| 5,020,579 | A | 6/1991 | Strong |
| 5,060,873 | A | 10/1991 | Strong |
| 5,080,153 | A | 1/1992 | Waterman |
| 5,137,219 | A | 8/1992 | Morey |
| 5,385,308 | A | 1/1995 | Gearing et al. |
| 5,390,865 | A | 2/1995 | Vandermoien et al. |
| 5,605,291 | A | 2/1997 | Doskocil |
| 5,961,057 | A | 10/1999 | Turner |
| 6,027,055 | A | 2/2000 | Diskocil |
| 6,257,511 | B1 | 7/2001 | Turner |
| 6,592,059 | B2 * | 7/2003 | Ito et al. ............ 241/55 |
| 6,910,648 | B1 | 6/2005 | Reinhold |
| 7,066,416 | B2 | 6/2006 | Reinhold |
| 2005/0023388 | A1 | 2/2005 | Reinhold |

* cited by examiner

*Primary Examiner*—Mark Rosenbaum
(74) *Attorney, Agent, or Firm*—Law Office of John W. Harbst

(57) ABSTRACT

A portable chipper apparatus having a chipping disc with front and rear faces and a series of slots extending through the disc. A knife is arranged on the front face of the disc in proximate relation relative to each slot. At least two shredder/detanglers are secured to the rear face of the disc. Each shredder/detangler includes a base and at least three generally planar and substantially identical paddles arranged in spaced and generally parallel relation relative to each other. The paddles extend from the base at an angle and projects away from the rear face of the chipping disc. The paddles on each shredder/detangler have a continuous elongated linear cutting edge for impacting with and further reducing and cutting the size of the chipped material engaged by the paddles. Each shredder/detangler further includes an impeller at a distal end of the base.

18 Claims, 7 Drawing Sheets

PORTABLE ROTARY CHIPPER APPARATUS

FIELD OF THE INVENTION DISCLOSURE

This invention disclosure relates to a portable rotary chipper apparatus for reducing materials received thereby into smaller particulate matter or chips.

BACKGROUND OF THE DISCLOSURE

Many industrial, commercial and household applications require the breaking up of relative large objects into smaller pieces. The reduction process is variously referred to as cutting, chipping, shredding, mulching, or grinding depending in part on the size of the end product. Chipping is historically accomplished by a rotatably driven disc which produces particulate matter or chips ranging from about 3/4 inches and above. Some chippers have been designed which are portable and are capable of processing at least small branches into wood chips which can then be gathered at the site of the tree trimming operation or can be distributed on the ground whereupon the chips will naturally decay without causing environmental pollution.

The rotatably driven disc is the heart of any chipper apparatus and typically includes a relatively thick metal disc mounted for rotation about a fixed axis and has at least one cutter knife mounted adjacent to a slot in the disc. The disc is rotatably driven at relatively high speeds and is typically mounted in a chamber of a housing. As material is fed toward the disc, the knife continually cuts and slices the material to form chips which pass through the chip slot in the disc to a rear side of the disc. The chips are forced from the rear side of the disc in part by centrifugal force. A discharge chute extends from the disc housing and carries the chips for discharge from the chipper apparatus.

Some materials, such as grass, leaves, needles and small branches which are inevitably fed with the other materials into the chipper apparatus but which are not cut by the knife on the rotating disc can pass to the rear side of the rotary disc. As the disc rotates, some of these materials tend to move toward the center of the rotary disc and can become entangled with the shaft about which the disc rotates. Of course, a buildup of these entangled materials about the rotating disc shaft can cause both significant and costly damages to the chipper apparatus. During operation, the chipping operation must be occasionally halted to untangle such materials from about the shaft. This downtime adds to the overall cost of the chipping operation.

Thus, there is a continuing need and desire for a chipping apparatus which is designed to inhibit the continuing buildup and entanglement of materials about the shaft on which the rotary chipping disc is mounted.

SUMMARY OF THE INVENTION DISCLOSURE

In view of the above, and in accordance with one aspect, there is provided a portable rotary chipper apparatus including a housing and a rotatably driven chipping disc mounted in the housing. The housing has an inlet for receiving materials to be chipped and a peripheral wall with a discharge chute for expelling chipped material from the housing. The rotatably driven disc has front and rear faces with a series of slots extending through the disc to allow chipped materials to pass from a front side to a rear side of the disc. A knife, arranged on the front face of the disc in proximate relation relative to each slot, is provided for reducing and forming chips from the materials fed into the inlet of chipper apparatus. An infeed chute is preferably provided for directing materials to the inlet to the chipper housing.

At least two shredder/detanglers are secured to the rear face of the disc in diametrically opposed relation relative to each other. Each shredder/detangler includes a base and at least three generally planar and substantially identical paddles arranged in spaced and generally parallel relation relative to each other. Each paddle extends from the base at a predetermined angle and away from the rear face of the chipping disc such that, upon rotation of the disc within said housing, the paddles induce an air flow through the slots in the disc whereby drawing chipped materials through the slots toward the rear side of the disc. Each paddle also has a continuous elongated linear cutting edge for impacting with and further reducing the size of the material engaged by the paddles. Each shredder/detangler further includes an impeller at a distal end of the base for assisting in moving the chipped material toward and out through the discharge chute from the housing.

In one form, the paddles on each shredder/detangler extend away from the base at an angle ranging between about 65° and about 85°. Preferably, the paddles on each shredder/detangler have a generally rectangular configuration in plan.

An edge of the impeller on each shredder/detangler is preferably arranged proximate relative to a peripheral wall of the housing to promote moving the chipped material toward and out through the discharge chute. Preferably, the impeller on each shredder/detangler has a generally rectangular configuration in plan. In one form, each shredder/detangler is releasably secured to the rear face of the chipper disc through a series of fasteners.

According to another aspect there is provided a portable rotary chipper apparatus including a housing mounted on a portable frame and a chipping disc mounted within the housing. In this embodiment, the housing defines a chamber with an inlet for receiving materials to be chipped. The chamber has a peripheral wall and a discharge chute for expelling chipped material from the chamber. The chipping disc operably divides the chamber in the housing into a front chamber and a rear chamber. An infeed chute preferably directs materials to the inlet to the housing.

The chipping disc is connected to a drive shaft for rotation about an axis of rotation and has a peripheral edge arranged adjacent to the peripheral wall of the housing chamber along with front and rear faces with a series of slots extending through the disc whereby allowing chipped materials to pass from a front side to a rear side of the disc. A knife, on the front face of the disc in proximate relation relative to each slot, is provided for reducing and forming chips from the materials fed into the inlet of the chipper apparatus. Two shredder/detanglers are fixed to the rear face of the disc in diametrically opposed relation relative to each other. Each shredder/detangler includes a base and at least three generally planar and substantially identical paddles arranged in spaced and generally parallel relation relative to each other. The paddles on each shredder/detangler extend from the base at an angle and project away from the rear face of the chipping disc such that, upon rotation of the disc within the housing, the paddles induce an air flow through the slots in the disc whereby drawing chipped materials through the slots toward the rear side of the disc. Each paddle has a continuous elongated linear cutting edge for impacting with and further reducing the size of the chipped material engaged by the paddles. Each shredder/detangler further includes an impeller at a distal end of the base for assisting in moving the chipped material toward and out through the discharge chute from the housing.

Preferably, the paddles on each shredder/detangler extend away from the base at an angle ranging between about 65° and about 85°. In one form, the paddle on each shredder/detangler has a generally rectangular configuration in plan.

In a preferred form, an edge of the impeller of each shredder/detangler is proximately arranged relative to the peripheral wall of the housing to promote moving the chipped material toward the and out through the discharge chute and from the chipper housing. In one form, the impeller on each shredder/detangler is generally rectangular configuration in plan. Preferably, each shredder/detangler is releasably secured to the chipper disc through a series of fasteners.

According to another aspect, there is provided a chipping disc for a portable rotary chipper apparatus. The chipping disc has front and rear faces with a series of slots extending through the disc. A knife is fixed to the front face of the disc in proximate relation relative to each slot. At least two shredder/detanglers are fixed to the rear face of the disc. Each shredder/detangler includes a base and at least three generally planar and substantially identical paddles arranged in spaced and generally parallel relation relative to each other. The paddles extend from the base at an angle and projects away from the rear face of the chipping disc. The paddles on each shredder/detangler have a continuous elongated linear cutting edge for impacting with and further reducing and cutting the size of the chipped material engaged by the paddles. Each shredder/detangler further includes an impeller at a distal end of the base.

The paddles on each shredder/detangler preferably extend away from the base at an angle ranging between about 65° and about 85°. Moreover, the paddles on each shredder/detangler preferably have a generally rectangular configuration in plan. In one form, the impeller on each shredder/detangler has a generally rectangular configuration in plan.

DETAILED DESCRIPTION OF THE INVENTION DISCLOSURE

Figure 1:
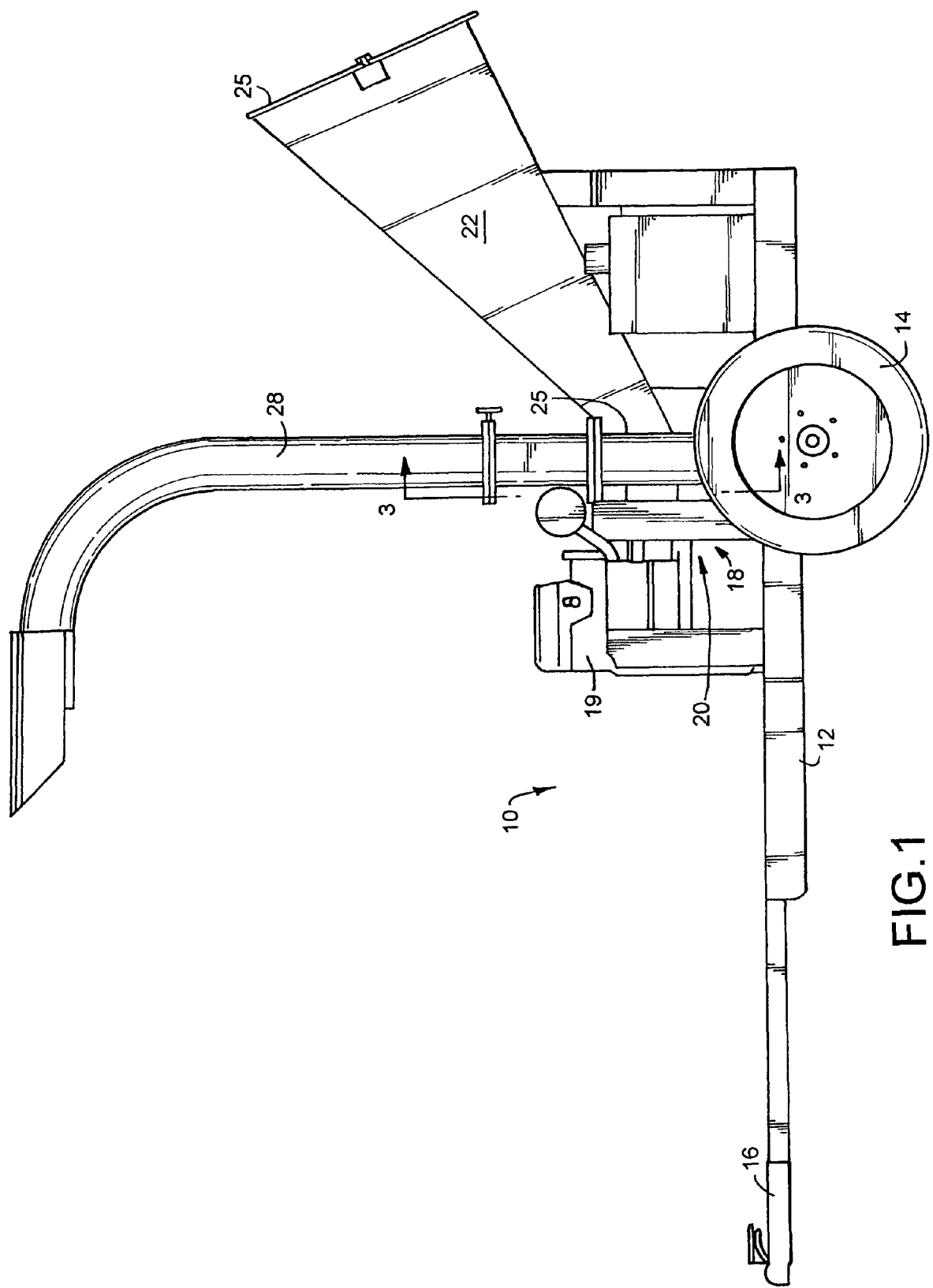
FIG. 1 is a side elevational view of one form of a portable chipper apparatus embodying principals of the present invention disclosure.

While the present invention is susceptible of embodiment in multiple forms, there is shown in the drawings and will hereinafter be described a preferred embodiment, with the understanding the present disclosure is sets forth an exemplification of the invention which is not intended to limit the invention disclosure to the specific embodiment illustrated and described.

Referring now to the drawings, wherein like reference numerals indicate like parts throughout the several views, there is shown in FIG. 1 one embodiment of a portable chipper apparatus, generally identified by reference numeral 10, and which includes a rigid frame 12 which is supported for movement toward a rear end thereof by a transverse axle and a pair of wheels 14. A pulling tongue and hitch 16 is arranged toward an opposite end of the frame 12. As such, the chipper apparatus 10 can be readily pulled behind a truck, automobile or tractor. The chipper apparatus 10 further includes a chipper assembly carried on the frame 12 and generally identified by reference numeral 18. A self-propelled engine 19 is also mounted on the frame 12 and is operably coupled in a conventional manner to the chipper assembly 18.

Figure 2:
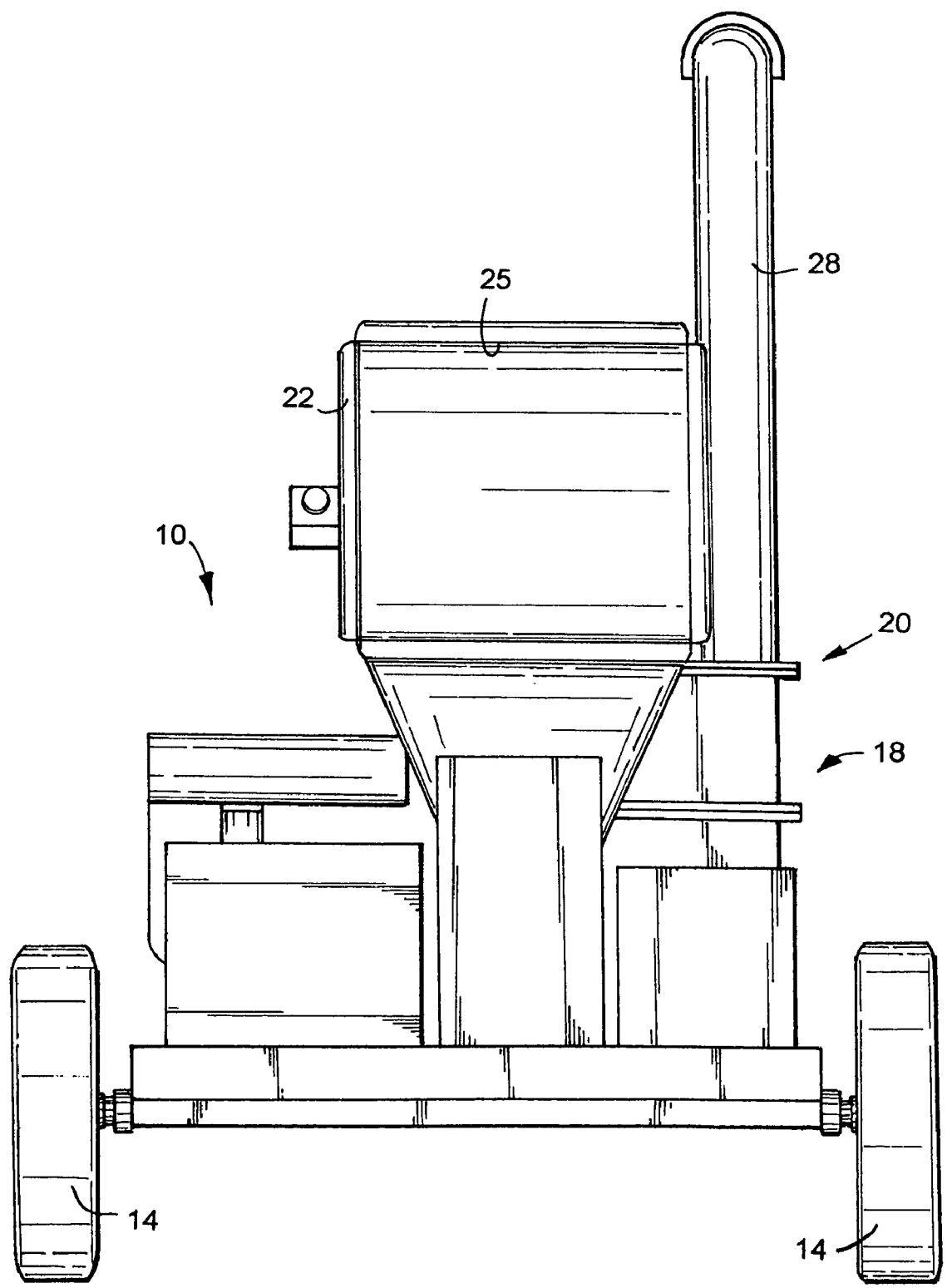
FIG. 2 is an end view of the portable chipper apparatus shown in FIG. 1.
Figure 4:
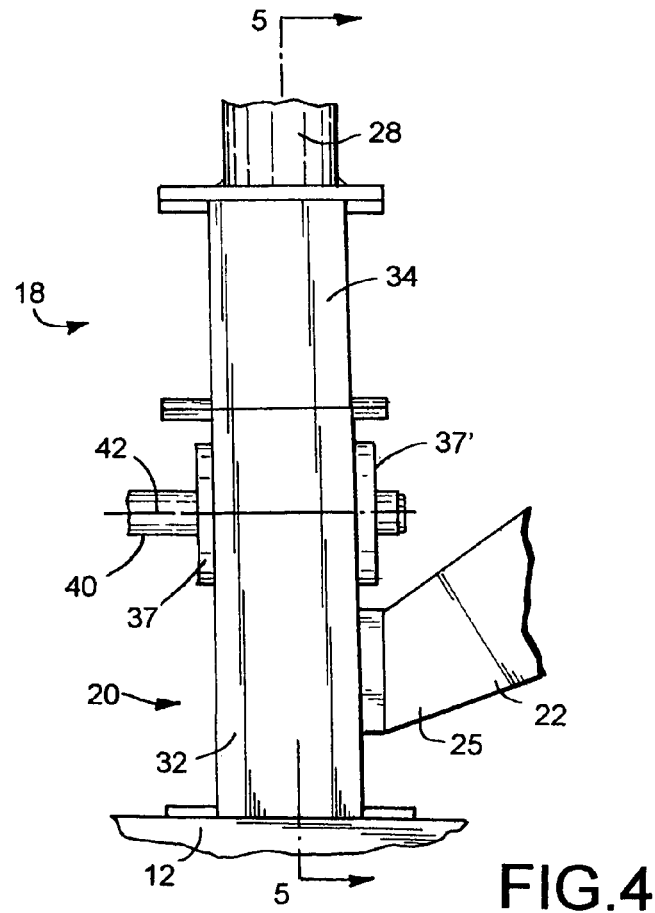
FIG. 4 is a fragmentary and enlarged side view of the chipper apparatus housing illustrated in FIG. 3.
Figure 5:
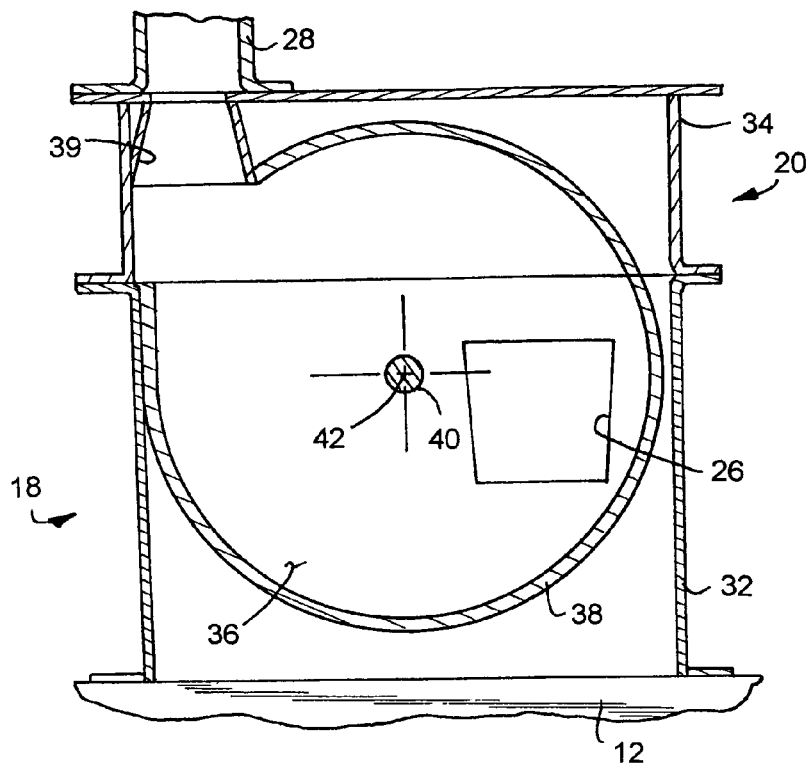
FIG. 5 is a sectional view taken along line 5-5 of FIG. 4.

The chipper assembly 18 includes a housing assembly 20 which is securely mounted to the frame 12 of the chipper apparatus 10. Moreover, and as shown in FIGS. 1, 2 and 4, an inlet chute 22 gravitationally feeds materials to an inlet 26 (FIG. 5) of the chipper housing 20. In the embodiment illustrated in FIG. 1, chute 22 has a convergent design between the free inlet end 25 and the discharge end 25 opening to the housing assembly 20. A discharge chute 28 directs chipped materials from the chipper housing 20.

Figure 3:
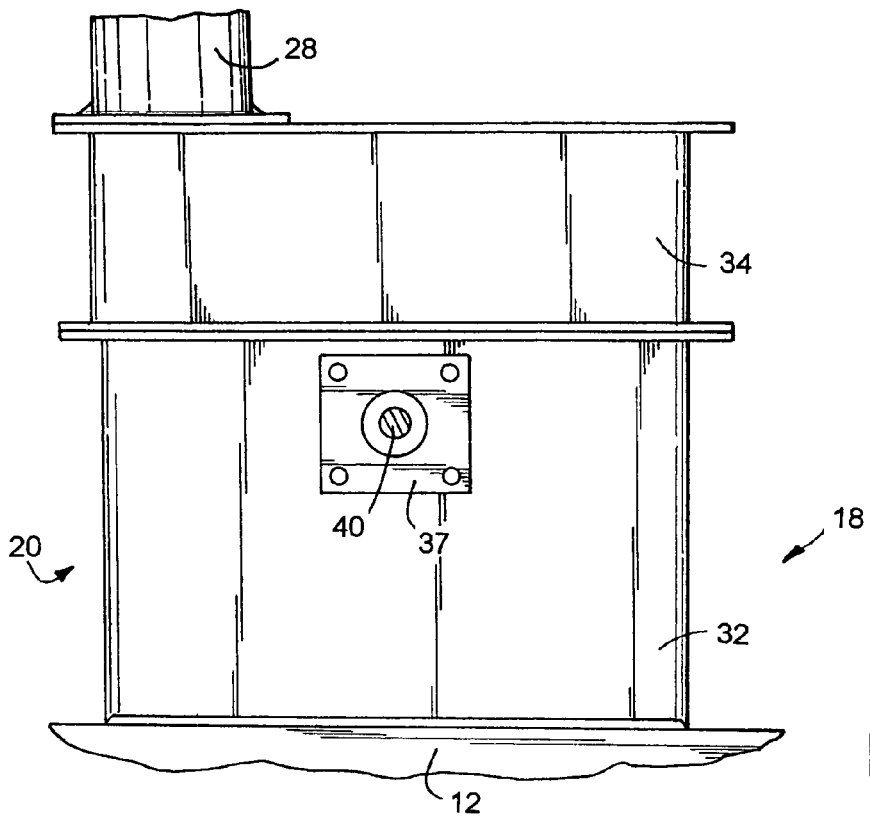
FIG. 3 is a fragmentary and enlarged view of the chipper apparatus housing taken along line 3-3 of FIG. 1.

Turning to FIGS. 3 and 4, housing assembly 20 preferably includes a bottom or lower shell 32 and a top or upper shell 34 which are interconnected to each other and combine relative to each other to define a chipping chamber 36 (FIG. 5) having a peripheral wall 38. Notably, the inlet 26 (FIG. 5) of the housing assembly 20 opens to the chamber 36 whereby permitting materials to be chipped to be introduced into the chamber 36. In the embodiment shown in FIG. 5, housing assembly 20 furthermore defines an outlet 39 tangentially arranged relative to chamber 36. As shown, the discharge chute 28 is also preferably arranged in tangential relationship relative to the chamber 36 and receives chipped materials passing through the outlet 39 of housing assembly 20. Moreover, and returning to FIG. 3, suitable bearing structure 37 and 37' is carried by the housing assembly 20 so as to mount a stub shaft 40 for rotation about a fixed axis 42. Suffice it to say, shaft 40 is operably coupled in a well known manner to the engine 19 which drives the shaft 40 for rotation about axis 42 at relatively high rotational speeds.

Figure 6:
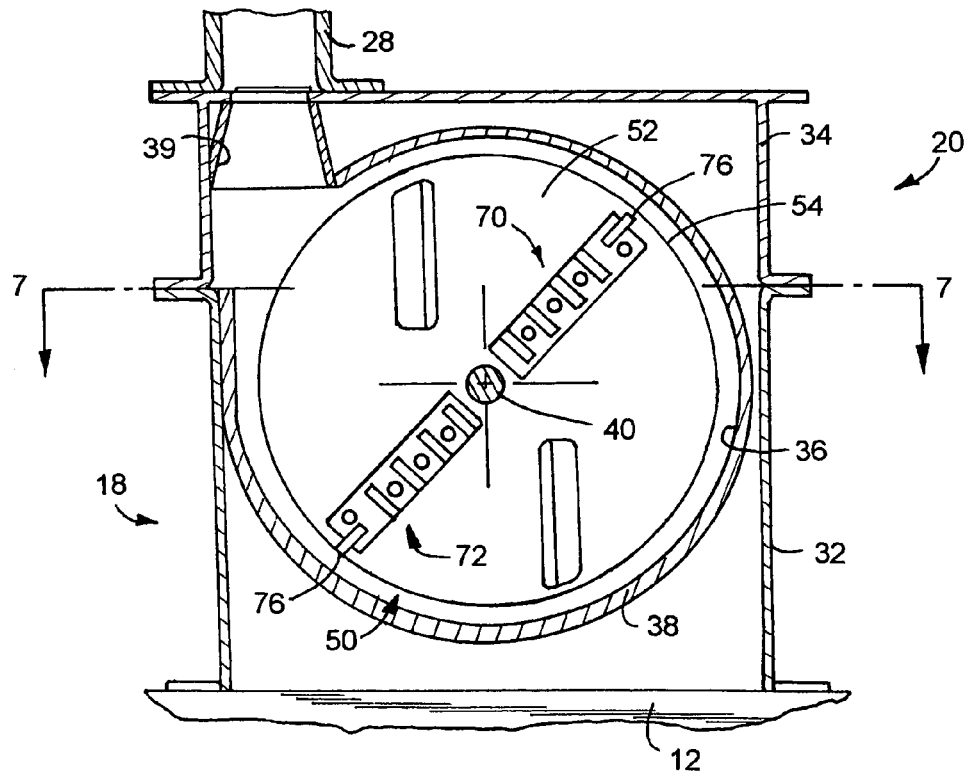
FIG. 6 is a sectional view similar to FIG. 5 but with the chipper disc removed from the chipper apparatus housing.
Figure 7:
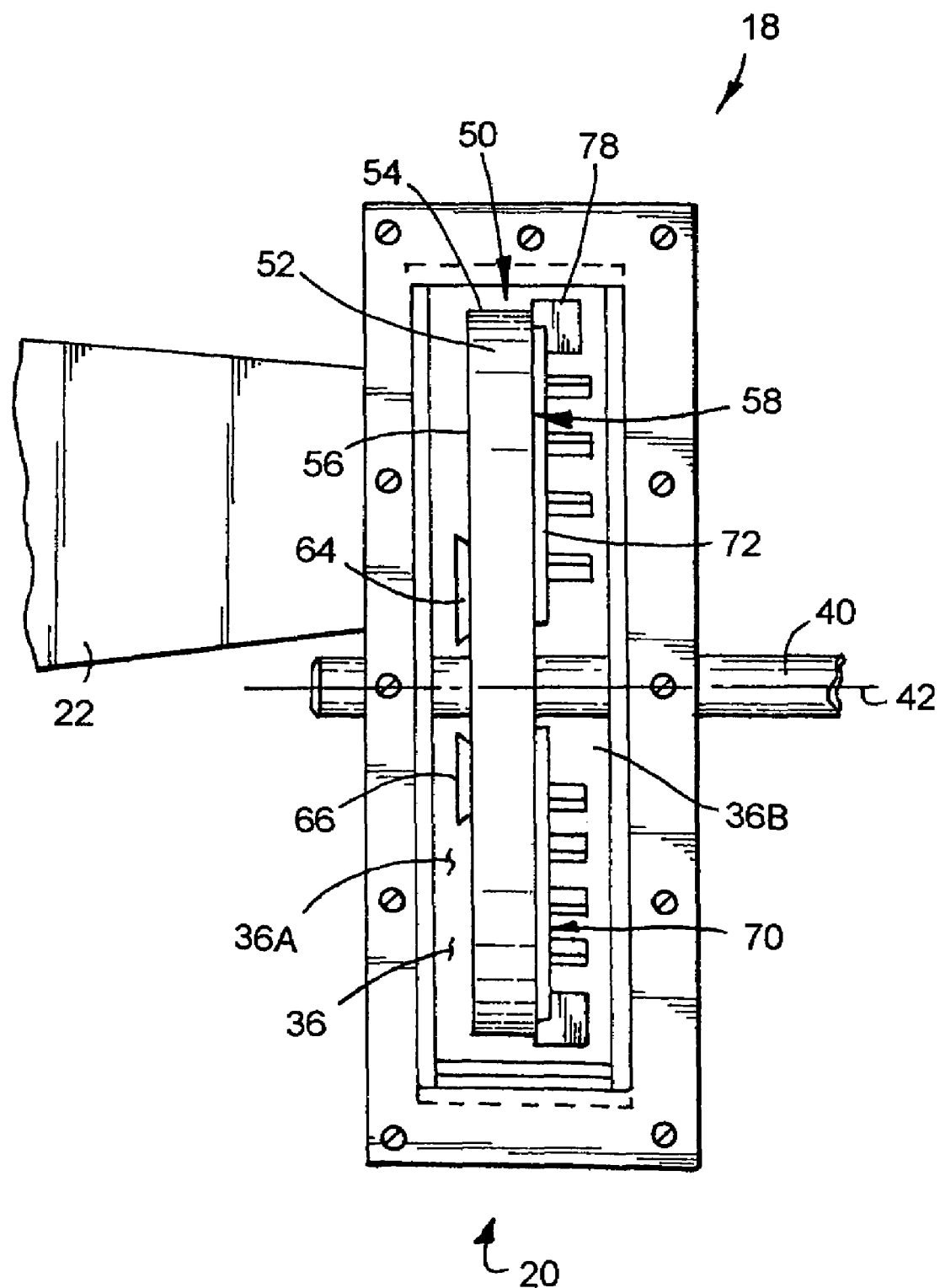
FIG. 7 is a fragmentary sectional view taken along line 7-7 of FIG. 5.
Figure 10:
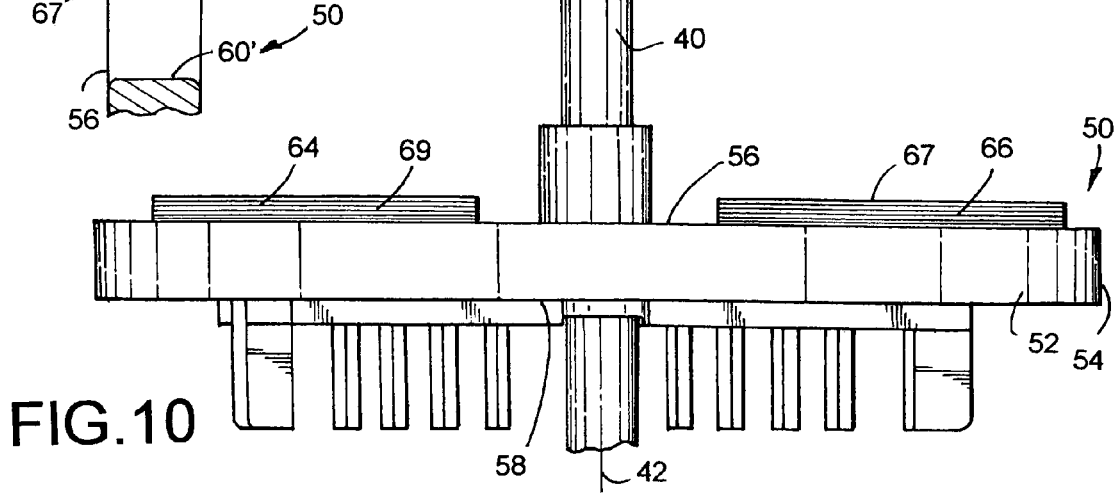
FIG. 10 is a plan view of the chipper disc illustrated in FIG. 8.

As shown in FIG. 6, a chipping disc 50 is non-rotatably secured to the shaft 40 for rotation about axis 42 within chamber 36 of the housing assembly 20. The chipping disc 50 is the heart of the chipper apparatus 10 and includes a relatively thick metal plate 52 having a peripheral edge 54 arranged adjacent to the peripheral wall 38 (FIG. 6) of the chamber 36 defined by housing assembly 20. Preferably, the metal plate 52 forming the chipping disc 50 is about 1.0 to about 2.5 inches in thickness. As shown in FIGS. 7 and 10, the chipping disc 50 has front and rear generally planar faces or sides 56 and 58, respectively. As shown in FIG. 7, when arranged within chamber 36 of housing assembly 20, the chipping disc 50 effectively divides the chamber 36 into a front chamber 36A and a rear chamber 36B.

Figure 8:
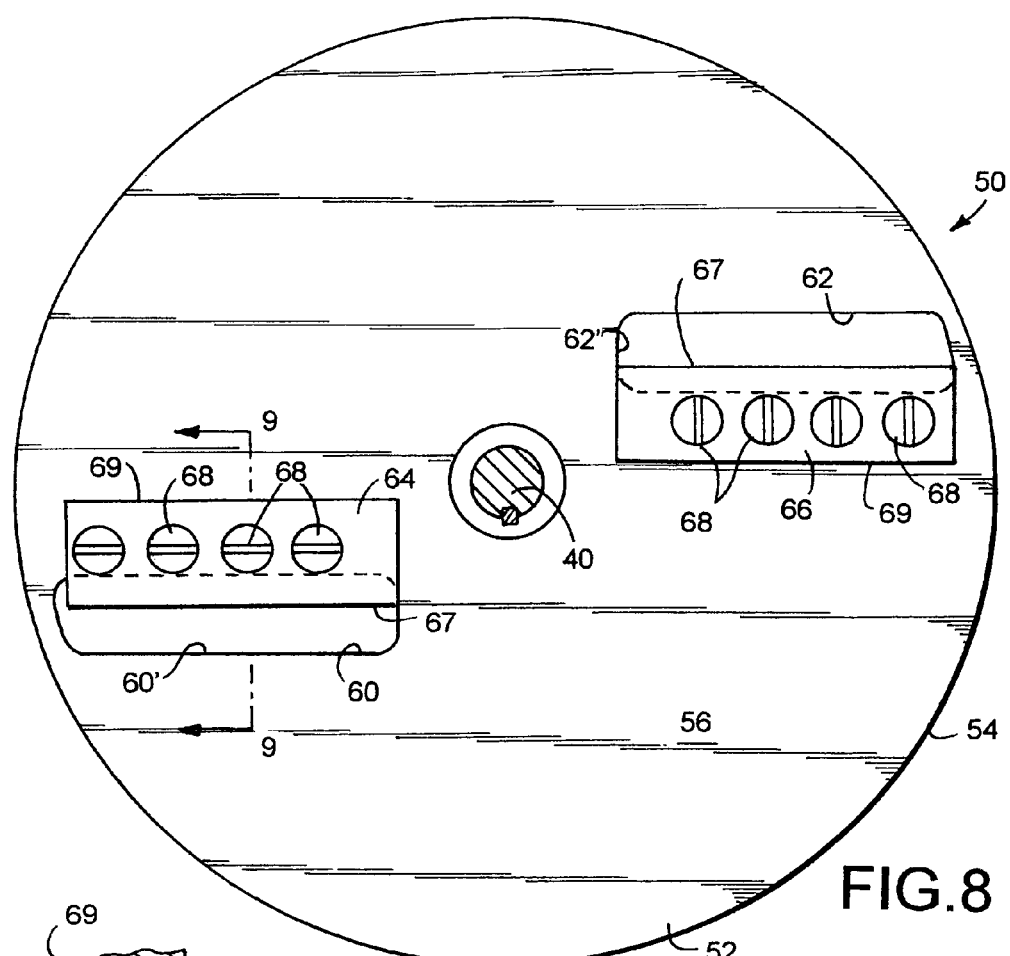
FIG. 8 is an enlarged elevational view of a front side of the chipper disc.

Turning to FIG. 8, the chipping disc 50 furthermore defines a plurality of slots or openings which extend through the disc 50 front the front chipping side or face 56 to the rear discharge face or side 58 (FIG. 7) of disc 50. In the embodiment illustrated for exemplary purposes in FIG. 8, the chipping disc 50 defines two openings or slots 60 and 62 arranged in diametrically opposed relation relative to each other. Notably, the slot or opening 60 has a closed marginal edge 60' defined by the disc 50. Similarly, the slot or opening 62 has a closed marginal edge or opening 62' defined by the disc 50.

Chipping disc 50 furthermore carries a plurality of knives or chipping blades on the front chipping face 56 of the disc 50. In the illustrated embodiment, the front chipping face 56 of chipping disc 50 carries two radially extending knives or chipping blades 64 and 66 in diametrically opposed relation relative to each other. Each knife 64, 66 is positively secured in non-movable or fixed relation relative to the chipping disc 50. The knife or chipping blade 64 is arranged adjacent to and slightly extends past the radial marginal edge 60' of slot 60. The knife or chipping blade 66 is arranged adjacent to and slightly extends past the radial marginal edge 62' of slot 62. As material gravitationally passes toward the disc 50, the knife or blade 64 arranged adjacent the closed marginal edge 60' of slot 60 cuts or slices the material into chips which pass through the slot 60 to the rear chamber 36B of housing assembly 20. Similarly, and as material gravitationally passes toward the disc 50, the knife or blade 66 arranged adjacent the closed marginal edge 62' of slot 62 cuts or slices the material into chips which pass through the slot 62 to the rear chamber 36B of housing assembly 20.

Figure 9:
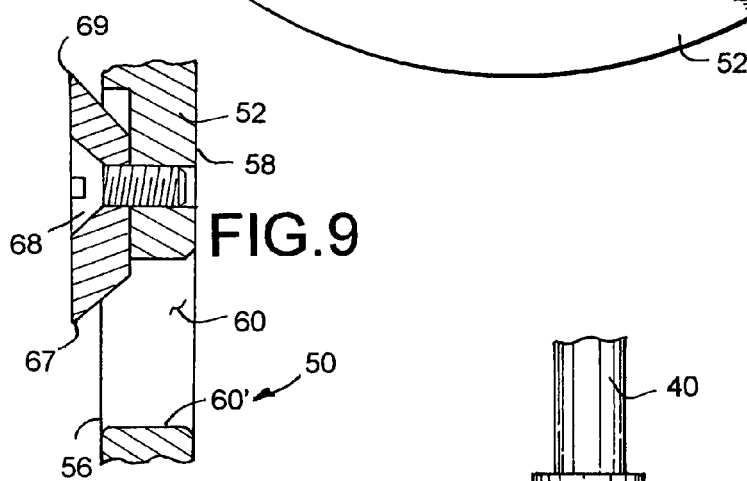
FIG. 9 is an enlarged sectional view taken along line 9-9 of FIG. 8.

In a preferred form, the chipping knives or blades 64, 66 are substantially identical relative to each other. As such, a detailed description of only blade 64 will be provided. Suffice it to say, and as shown in FIG. 9, each knife or blade preferably has two cutting edges 67 and 69 and is therefore reversible to enhance the use thereof. Moreover, each knife or blade 64, 66 is made expendable such that once both cutting edges 67 and 69 are dulled, it can be readily replaced. As shown in FIGS. 8 and 9, each knife or blade is releasably attached to the front side or face of the disc 50 through use of suitable fasteners 68.

Figure 11:
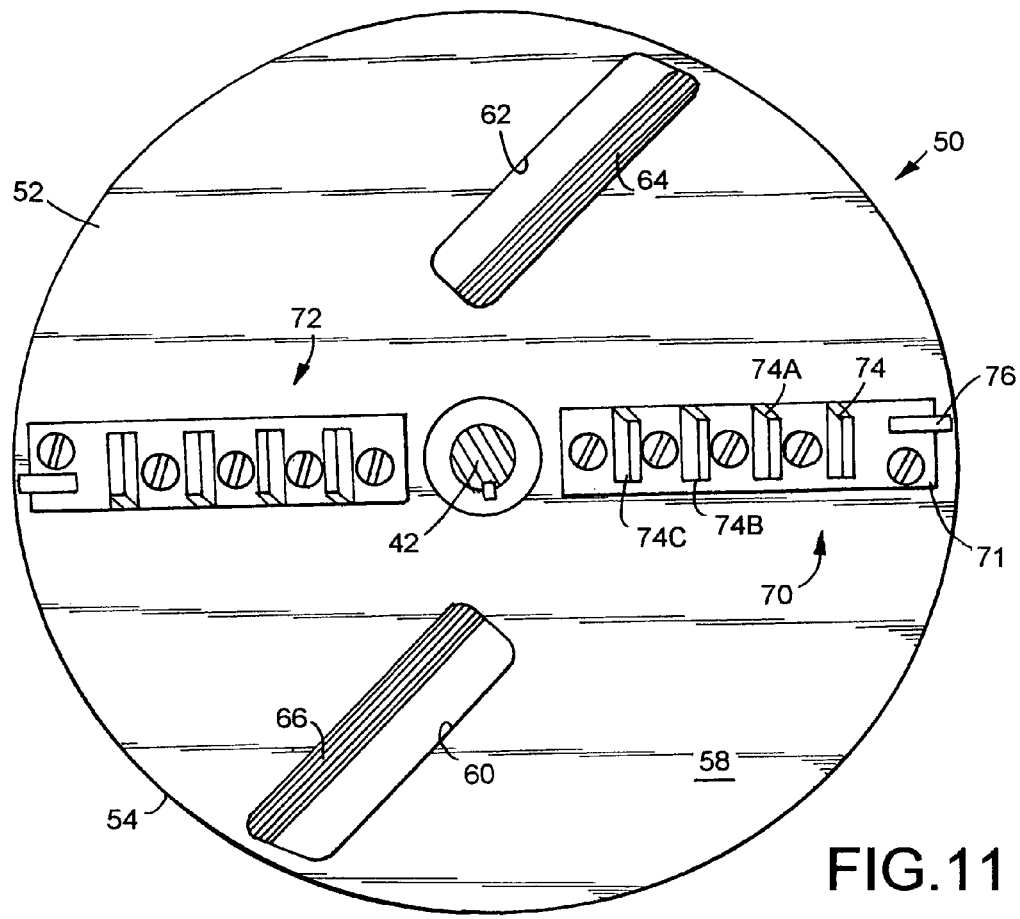
FIG. 11 is an enlarged elevational view of a rear side of the chipper disc.

As shown in FIGS. 7 and 11, chipping disc 50 is furthermore provided with a plurality of shredder/detanglers on the rear face 58 of the disc 50. In the embodiment illustrated in FIG. 11, the rear face 58 of chipping disc 50 carries two radially extending shredder/detanglers 70 and 72 arranged in diametrically opposed relation relative to each other and which are angularly offset from the chipping blades or knives 64 and 66 arranged on the opposite side or face of the disc 50. Each shredder/detangler 64, 66 is positively secured in non-movable or fixed relation relative to the chipping disc 50. Preferably, the shredder/detanglers 70, 72 are substantially identical relative to each other. Accordingly, only shredder/detangler 70 will be discussed in detail.

Figure 12:
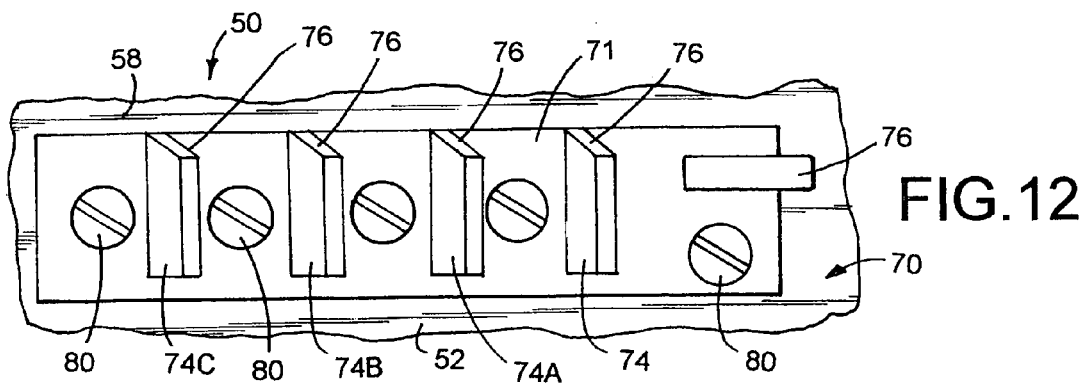
FIG. 12 is a plan view of one of the shredder/detanglers mounted to a rear side of rotary disc.
Figure 13:
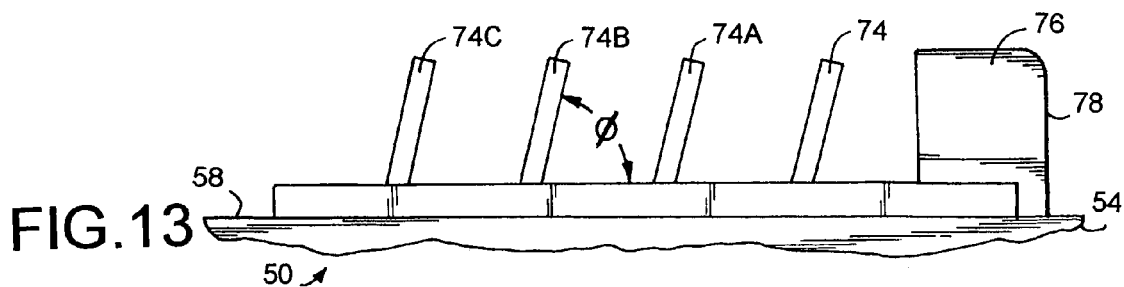
FIG. 13 is an elevational view of the shredder/detangler illustrated in FIG. 12.

In the form shown in FIG. 12, each shredder/detangler includes a base 71 and at least three generally planar paddles 74, 74A, and 74B. In the illustrated embodiment, each shredder/detangler includes four generally planar paddles 74, 74A, 74B and 74C. Each paddle 74, 74A, 74B and 74C is arranged in radially spaced and generally parallel relation relative to each other and at different radial distances from the rotational axis 42 for disc 50 (FIG. 11). In one form, each paddle 74, 74A, 74B and 74C extends from the base 71 at an acute angle and projects away from the rear face or side 58 of the disc 50. In the form illustrated in FIG. 13, the paddles 74, 74A, 74B and 74C extend from and form an acute angle θ ranging between about 65° and about 85° relative to the shredder/detangler base 71.

In a preferred form, each paddle 74, 74A, 74B and 74C has a generally rectangular configuration in plan. Upon rotation of the disc 50 within chamber 36 of housing assembly 20, the paddles 74A, 74B, 74C and 74D create or induce an air flow through the slots 60 and 62 in the disc 50 whereby drawing chips and related materials through the slots 60 and 62 into the rear or chip chamber 36B of the housing assembly 20.

To facilitate the discharge of chips and related material from the rear chamber 36B of the housing assembly 20 (FIG. 7), and as shown in FIG. 12, each paddle 74, 74A, 74B and 74C is provided with a continuous elongated linear cutting edge 76. The continuous elongated cutting edge 76 is provided along at least that surface of each paddle 74, 74A, 74B and 74C which is disposed to impact with the chips and related materials passing through the slots 60 and 62 in the disc 50. As such, and because of the relatively high rotational speed of disc 50, the impact of the cutting edge 76 with the chips and related materials tends to further reduce the size of the chips and related materials whereby facilitating their discharge from the rear chamber 36 of the chipper housing 20. The radial spacing between the paddles 74, 74A, 74B and 74C coupled with the continuous elongated linear cutting edge 76 on each paddle 74, 74A, 74B and 74CD tends to inhibit any stringy or elongated materials, which may have passed through the openings 60, 62 in the disc 50, from becoming entangled about and/or around the drive shaft 40 thus significantly reducing maintenance and costly downtime for the chipper apparatus 10.

To furthermore promote the discharge of chips and related material from the rear chamber 36 of the housing assembly, each shredder/detangler further includes an impeller 76 arranged at a distal end of the base 71. Preferably, each impeller 76 is generally planar and is generally rectangular in plan. As shown in FIG. 7, a radial outermost edge 78 of each impeller 76 is proximately arranged relative to the peripheral wall 38 of the chamber 36. In the illustrated embodiment, each impeller 76 extends from the radial outermost edge of the base 71 and is disposed in generally normal relation relative to the paddles 74, 74A, 74B and 74C on each shredder/detangler. Ac shown in FIG. 6, when disc 50 is rotatably driven, the impeller 76 on each shredder/detangler assists in forcibly moving and propelling chips and related material from chamber 36B toward the outlet 39 and into the discharge chute 28 from whence the chips and related materials are discharged from the housing assembly 20.

To promote manufacturing of chipper disc 50, each shredder/detangler 70, 72 is preferably attached to the rear face 58 of the disc 50 so as to allow removal of the shredder/detanglers 70, 72 when required or desired. As shown in FIG. 12, each shredder/detangler 70, 72 is releasably attached to the rear face 58 of the disc 50 through a series of conventional fasteners 80.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. A portable rotary chipper apparatus comprising:

a housing having an inlet for receiving materials to be chipped and a peripheral wall with a discharge chute for expelling chipped material from said housing;

a rotatably driven chipping disc mounted in said housing, said disc having a peripheral edge arranged adjacent to the peripheral wall of said chamber along with front and rear generally parallel faces with a series of slots extending through said disc and opening to said front and rear faces of said disc whereby allowing chipped materials to pass from a front side of said disc to a rear side of said disc, with each slot having a closed margin, and wherein a knife is fixed to the front face of said disc in proximate relation relative to each slot for reducing and forming chips from the materials fed into the inlet of said wood chipper, and wherein at least two shredder/detanglers are attached to the rear face of said disc in diametrically opposed relation relative to each other, with each shredder/detangler including a base and at least three generally planar and substantially identical paddles arranged in radially spaced and generally parallel relation relative to each other, each paddle extends from said base at an acute angle and projects away from the rear face of said chipping disc such that, upon rotation of said disc within said housing, said paddles induce an air flow through the slots in said disc whereby drawing chipped materials through the slots toward the rear side of said disc, and with each paddle having a continuous elongated linear cutting edge for impacting with and further reducing the size of the chipped material engaged by said paddles, and with each shredder/detangler further including an impeller at a distal end of said base for assisting in moving the chipped material toward and out through said discharge chute from said housing.

2. The portable rotary chipper apparatus according to claim 1 wherein, each paddle extends away from said base at an angle ranging between about 65° and about 85°.

3. The portable rotary chipper apparatus according to claim 1 wherein, each paddle on said shredder/detangler has a generally rectangular configuration in plan.

4. The portable rotary chipper apparatus according to claim 1 wherein, wherein an edge of said impeller is proximately arranged relative to the peripheral wall of said housing to promote moving the chipped material toward the and out through said discharge chute for expelling chips therefrom.

5. The portable rotary chipper apparatus according to claim 1 wherein, the impeller on said shredder/detangler has a generally rectangular configuration in plan.

6. The portable rotary chipper apparatus according to claim 1 further including an infeed chute for directing materials to the inlet to said housing.

7. The portable rotary chipper apparatus according to claim 1 wherein, each shredder/detangler is attached to the rear face of said chipper disc through a series of fasteners.

8. A portable rotary chipper apparatus comprising:

a housing mounted on a portable frame and defining a volute shaped chamber with an inlet for receiving materials to be chipped, with said chamber having a peripheral wall, and a discharge chute for expelling chipped material from said chamber;

a chipping disc mounted within and dividing said chamber into a front chamber and a rear chamber, with said disc being connected to a drive shaft for rotation about an axis of rotation, said disc having a peripheral edge arranged adjacent to the peripheral wall of said chamber along with front and rear generally parallel faces with a series of slots extending through said disc and opening to said front and rear faces of said disc whereby allowing chipped materials to pass from a front side of said disc to a rear side of said disc, with each slot having a closed margin, and wherein a knife is fixed to the front face of said disc in proximate relation relative to each slot for reducing and forming chips from the materials fed into the inlet of said wood chipper, and wherein at least two shredder/detanglers are fixed to the rear face of said disc in diametrically opposed relation relative to each other, with each shredder/detangler including a base and at least three generally planar and substantially identical paddles arranged in radially spaced and generally parallel relation relative to each other, with each paddle extending from said base at an angle and projecting away from the rear face of said chipping disc such that, upon rotation of said disc within said housing, said paddles induce an air flow through the slots in said disc whereby drawing chipped materials through the slots toward the rear side of said disc, and with each paddle having a continuous elongated linear cutting edge for impacting with and further reducing the size of the chipped material engaged by said paddles, and with each shredder/detangler further including an impeller at a distal end of said base for assisting in moving the chipped material toward and out through said discharge chute from said housing.

9. The portable rotary chipper apparatus according to claim 8 wherein, each paddle extends away from said base at an acute angle ranging between about 65° and about 85°.

10. The portable rotary chipper apparatus according to claim 8 wherein, each paddle on said shredder/detangler has a generally rectangular configuration in plan.

11. The portable rotary chipper apparatus according to claim 8 wherein, wherein an edge of said impeller is proximately arranged relative to the peripheral wall of said housing to promote moving the chipped material toward the and out through said discharge chute for expelling chips therefrom.

12. The portable rotary chipper apparatus according to claim 8 wherein, the impeller on said shredder/detangler has a generally rectangular configuration in plan.

13. The portable rotary chipper apparatus according to claim 8 further including an infeed chute for directing materials to the inlet to said housing.

14. The portable rotary chipper apparatus according to claim 8 wherein, each shredder/detangler is releasably secured to the rear face of said chipper disc through a series of fasteners.

15. A chipping disc for a portable rotary chipper apparatus including a peripheral edge along with front and rear generally parallel faces with a series of slots extending through said disc and opening to said front and rear faces of said disc, with each slot having a closed margin, and wherein a knife is arranged on the front face of said disc in proximate relation relative to each slot, and wherein at least two shredder/detanglers are secured to the rear face of said disc in diametrically opposed relation relative to each other, with each shredder/detangler including a base and at least three generally planar and substantially identical paddles arranged in radially spaced and generally parallel relation relative to each other, with each paddle extending from said base at an acute angle and projects away from the rear face of said chipping disc, and with each paddle having a continuous elongated linear cutting edge for impacting with and further reducing the size of the chipped material engaged by said paddles, and with each shredder/detangler further including an impeller at a distal end of said base.

16. The chipping disc according to claim 15 wherein, each paddle extends away from said base at an angle ranging between about 65° and about 85°.

17. The chipping disc according to claim 15 wherein, each paddle on said shredder/detangler has a generally rectangular configuration in plan.

18. The chipping disc according to claim 15 wherein, the impeller on said shredder/detangler has a generally rectangular configuration in plan.

* * * * *